United States Patent

[11] 3,534,821

[72] Inventor James L. Mitchell
 Memphis, Tennessee
[21] Appl. No. 665,105
[22] Filed Sept. 1, 1967
[45] Patented Oct. 20, 1970
[73] Assignee Midland Manufacturing Company, Inc.
 Memphis, Tennessee
 a corporation of Tennessee

[54] LAND LEVELING IMPLEMENT
 8 Claims, 8 Drawing Figs.
[52] U.S. Cl. ........................................ 172/780,
 172/261, 172/491, 172/398
[51] Int. Cl. ....................................... E02f 3/76
[50] Field of Search ............................ 172/779,
 780, 738, 739, 265, 710, 398

[56] References Cited
UNITED STATES PATENTS

| | | | |
|---|---|---|---|
| 1,239,945 | 9/1917 | Nichols | 172/710X |
| 1,073,759 | 9/1913 | Huck | 172/238 |
| 1,417,381 | 5/1922 | Hengst | 172/238 |
| 1,691,854 | 11/1928 | Overman | 172/779 |
| 2,138,304 | 11/1938 | Le Bleu | 172/238 |
| 2,189,962 | 2/1940 | Rae et al. | 172/779 |
| 2,254,414 | 9/1941 | Bowlin | 172/779 |
| 2,283,744 | 5/1942 | Lethlean | 172/779 |
| 2,786,285 | 3/1957 | Lindbeck | 172/238X |
| 2,881,540 | 4/1959 | Sprague | 172/779 |
| 3,043,034 | 7/1962 | Kober | 172/780X |
| 3,110,973 | 11/1963 | Reynolds | 172/239X |

Primary Examiner—Robert E. Bagwill
Assistant Examiner—Alan E. Kopecki
Attorney—John R. Walker, III ABSTRACT: A land leveling implement adapted to be trailingly drawn by a tractor. The implement includes a long frame, slide type runner members on the forward and rearward ends of the frame, an earth working member mounted at the middle of the frame, and trip means or unloader means including land running wheels for raising the earth working member when the tractive effort or draft force on the implement reaches a certain point.

Patented Oct. 20, 1970
3,534,821
Sheet 1 of 2
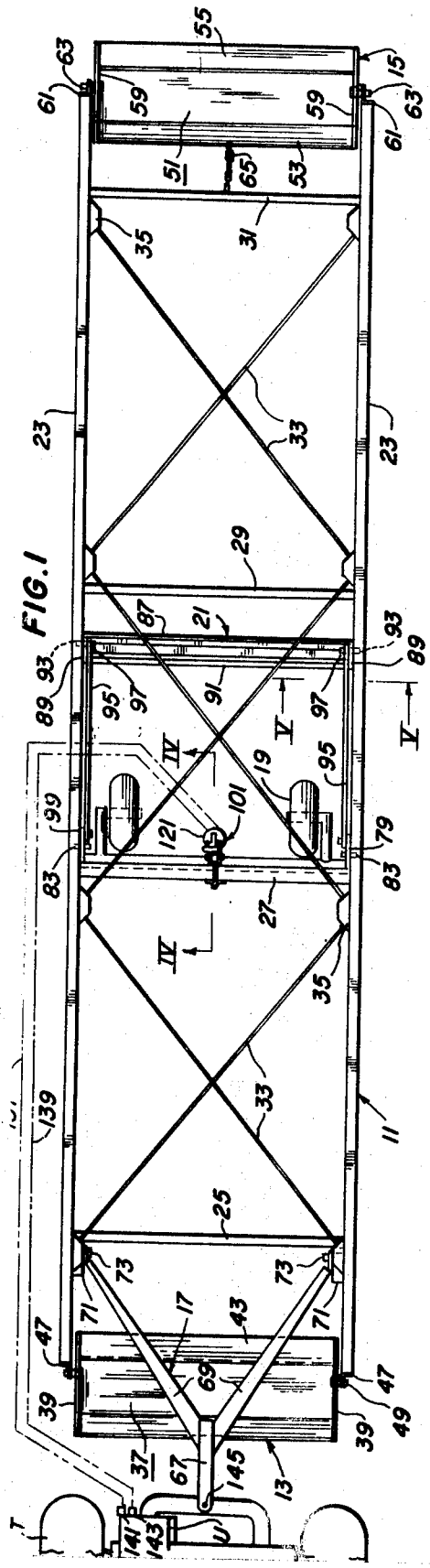
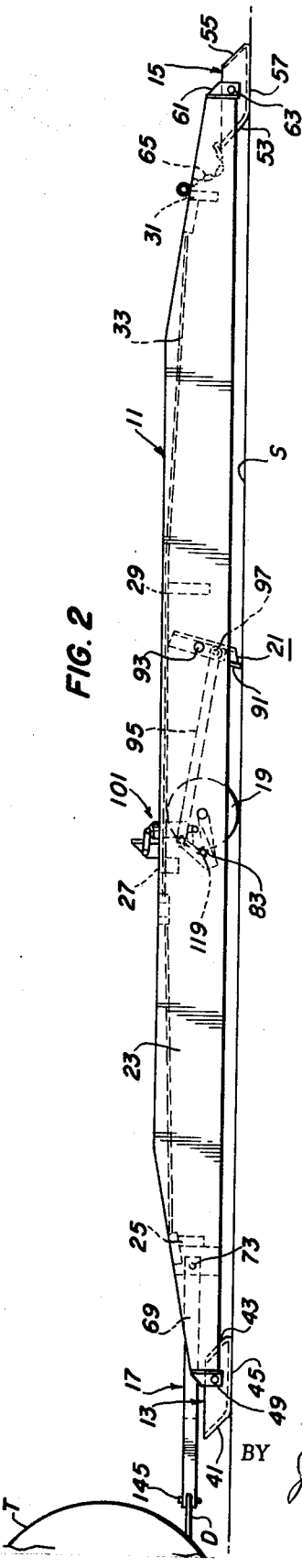
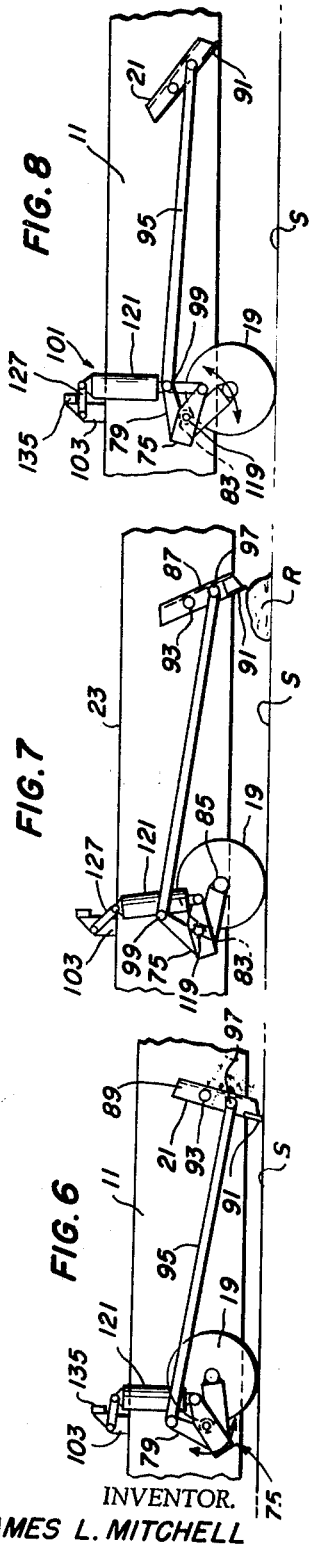
INVENTOR.
JAMES L. MITCHELL
BY John R. Walker, III
Attorney

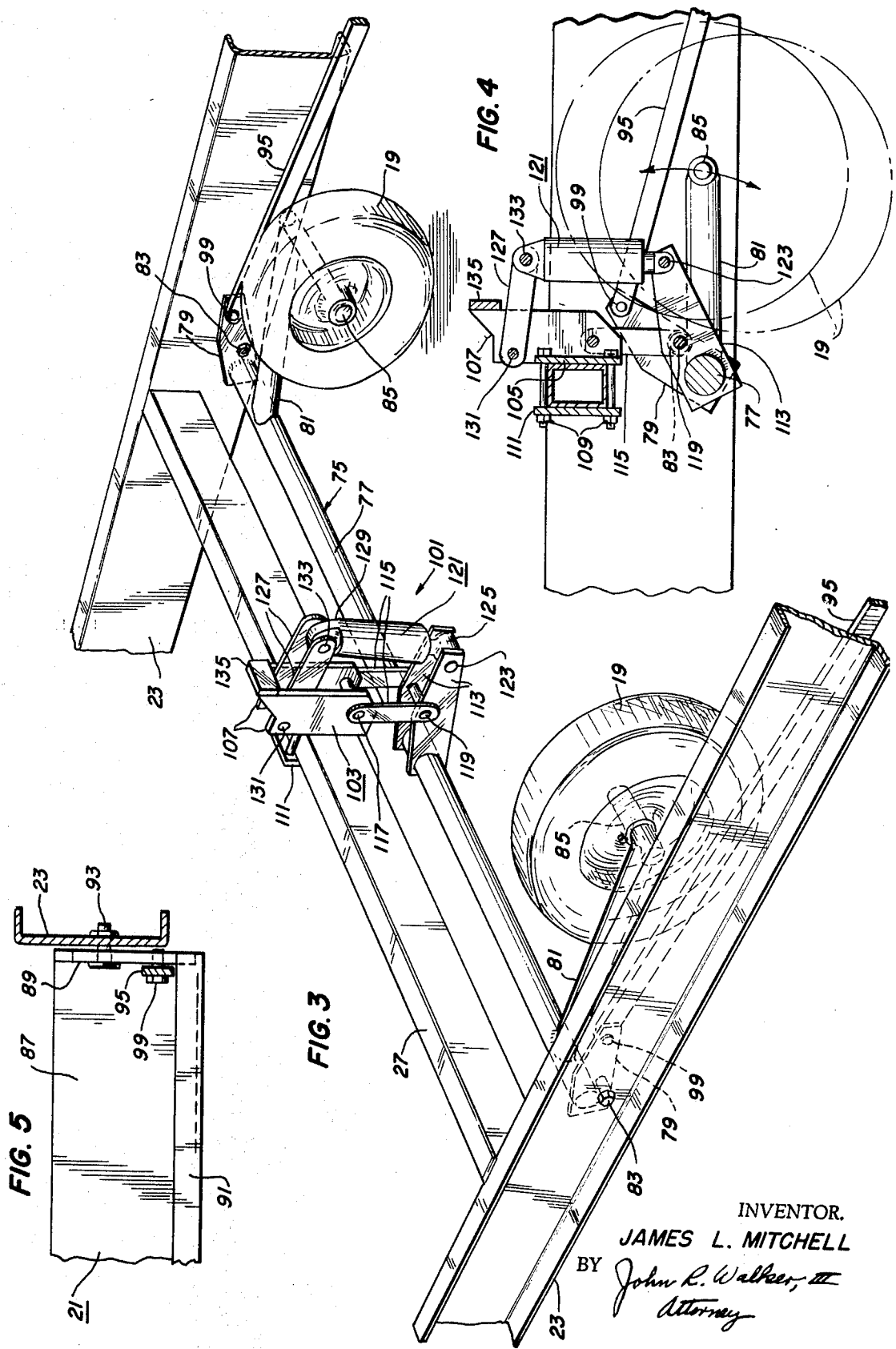

ND LEVELING IMPLEMENT

BACKGROUND OF THE INVENTION

1. Field of the Invention

Relates to land leveling apparatus principally employed for preparing farm land for cultivation. The invention may also relate to industrial earth moving apparatus and such as may include scraper blade members or scarifiers and other toothed earth engaging members.

2. Description of the Prior Art

The typical land leveler is continuously supported at its forward and rearward end portions of the leveler frame; a leveler commonly includes forwardly and rearwardly arranged sets of wheels which run on the land surface continuously whether the leveler is working or in transport. Prior leveler apparatus being tandemly attached to a tow tractor was difficult to turn or manipulate properly in a field being leveled; considerable field area and working time was required to turn the apparatus.

Another problem in prior art levelers was that of effectively regulating the depth of cut of the blade or earth working element of the leveler. There also was the problem of providing an effective release or trip means for raising the blade or earth working element when the element struck a fixed object such as a stump or stone.

Various earth working element and directional control means have heretofore been designed: U.S. Pat. Nos. 2,314,888 and 2,779,113 show articulated frame means for use in directional control and blade depth control in a leveler apparatus. U.S. Pat. Nos. 2,646,850 and 2,688,811 illustrate respectively rear wheel and front wheel steering means in a leveler. U.S. Pat. Nos. 2,994,143 and 3,081,567 illustrate four wheel or front and rear wheel steering means for directional control of a leveler. U.S. Pat. Nos. 3,043,034 and 3,141,250 include means for regulating the depth of cut of the earth working elements. Although many concepts are shown in the prior art, most are structurally complicated.

SUMMARY OF THE INVENTION

The land leveler of the present invention utilizes a pair of land wheels mounted at the middle of the leveler and includes leverage mechanism operable between the wheels and earth working element to cause the wheels to press downwardly and by reactive action to lift the leveler frame and earth working blade: tractor draft on the implement causes the wheels to move downwardly relative to the frame and progressively raise the blade element. This automatically reduces the depth of cut in the land surface. Likewise, when the blade strikes a solid object (a stump or stone) in the earth, the above described action will cause the leveler frame and blade to raise quickly and to trip over the object.

The leveler of the present invention is quickly and easily manipulated whether at work or in transport. The same land running wheels which function (as described above) to automatically regulate the depth of cut of the blade element also serve as the supporting wheels members for transporting the implement on the field or road surface or for lifting and maneuvering the leveler in the field.

The leveler includes jack means adapted to be detachably coupled to the hydraulic power system of a towing tractor and includes means for supporting the implement in an elevated level disposition. The leveler includes a pivotally mounted tongue, and the weight of the leveler rearwardly of its road wheels is greater than the weight of the leveler forwardly of its wheels. By this arrangement, as the jack means is actuated, sequentially, the forward runner end of the leveler raises abuttingly against the underside of the tongue, then as the jack means moves to a fully extended disposition, the rearward runner end of the frame is raised, and the leveler is arranged in a level elevated arrangement supported only by its road wheels. In this arrangement, the leveler is readily manipulated in a forward or rearward direction.

BRIEF DESCRIPTION OF THE DRAWING

FIG. 1 is a top view of the land leveling implement of the present invention and also shows a fragmentary portion of the tractor vehicle.

FIG. 2 is a side elevational view of the implement.

FIG. 3 is a perspective view of the midpart of the leveler implement illustrating the land wheels and jack means.

FIG. 4 is a vertical plane sectional view taken as on the line IV–IV of FIG. 1.

FIG. 5 is a vertical plane sectional view taken as on the line V–V of FIG. 1.

FIGS. 6 and 7 schematically illustrate respectively the arrangement of the leveler in a normal working disposition and in a tripping or unloading disposition.

FIG. 8 schematically illustrates the arrangement of the leveler in an elevated transportable disposition.

DESCRIPTION OF THE PREFERRED EMBODIMENT

The land leveling implement is long and laterally symmetrical and includes a frame 11; forward and rearward runner assemblies 13, 15; an earth working member 21; land wheels 19, 19; and a tongue 17.

Frame 11 includes a pair of channel-sectioned rail members 23, 23 rigidly boxed in parallel arrangement by parallel cross members 25, 27, 29, 31. Brace rods 33 tensioned respectively between frame brackets 35 prevent relative longitudinal displacement of rail members 23, 23 and provides rigidity of the frame.

Each assembly of forward and rearward runner assemblies 13, 15 may be constructed or modified from that shown in the drawings. Simplified runner assemblies are shown in the drawing for purposes of clarity: forward runner assembly 13 includes a body 37 and end plates 39, 39 fixedly secured in parallel arrangement at the opposite ends of body 37. Runner assembly 13 is open-topped and includes parallel inclined front and rear walls 41, 43 and a bottom wall 45. Runner brackets 47, 47 and pins 49, 49 pivotally mount forward runner assembly 33 transversely on the forward end of frame 11. Coaxial pins 49, 49 fixed respectively in end plates 39, 39 project oppositely and extend respectively through pivot apertures in brackets 47, 47.

Rearward runner assembly 15 is preferably of the same size and configuration as front runner assembly 13 and in like manner includes an open-topped runner body 51 including front, rear and bottom walls 53, 55, 57 and end plates 59, 59 secured parallel on opposite ends of body 51. Paired angle brackets 61, 61 fixed respectively on the end portions of frame rails 23, 23 and pins 63, 63 projecting oppositely from plates 59, 59 pivotally secure runner assembly 15 transversely on the rearward end of frame 11. A check chain 65 is secured at its opposite ends to cross member 31 and front wall 53 of runner assembly 15. Check chain 65 permits limited rocking movement of rearward runner assembly 15 and keeps the runner assembly in a proper attitude relative to the land surface.

Tongue 17 includes a medially arranged body 67 and a pair of rearwardly and outwardly projecting legs 69, 69 fixedly secured on the rearward end of body 67. A pair of tongue brackets 71, 71 are secured respectively on the inward sides of rail members 23, 23 slightly forwardly of cross member 25. Coaxially arranged pins 73, 73 extending respectively through the terminal portions of tongue legs 69, 69 and brackets 71, 71 pivotally secure tongue 17 about a horizontal axis.

Tongue 17 is vertically spaced from forward runner assembly 13 when the leveler is in a working disposition (see FIG. 2); when runner assembly 13 is raised from the land surface, the upper edge of runner wall 43 is adapted to engage the undersurface of tongue legs 69, 69 and thus provide check means for runner assembly 13. The engagement of runner wall 43 with the undersurface of tongue 17 keeps the runner assembly in a proper attitude relative to the land surface when frame 11 is raised by land wheels 19, 19.

A U-shaped yoke member 75 pivotally mounted between frame rails 23, 23 provides means form mounting wheels 19, 19. Yoke member 75 is integrally fabricated and includes a barlike body 77; platelike pivot arms 79, 79 secured on the opposite ends of body 77; and a pair of wheel arms 81, 81. Pivot pins 83, 83 extending respectively through arms 79, 79 and fixed coaxially in frame members 23, 23 pivotally secure yoke member 75 between rail members 23, 23. Yoke member 75 is adapted for pivotal rocking movement about the pivot axis of pins 83, 83. Convergingly projecting stub axles 85, 85 fixed respectively on the distal ends of wheel arms 81, 81 journal wheels 19, 19 in laterally spaced apart arrangement.

Earth working member 21, like forward and rearward runner assemblies 13, 15 is also shown in simplified structure. For the purpose of clarity in description, a substantially simple blade type earth working member is illustrated in the drawing and will be described as the preferred type earth engaging component of the leveler.

Earth engaging or earth working member 21 is of generally planar configuration and includes basically a back panel 87, end plates 89, 89 fixedly secured in parallel arrangement on the opposite end portions of back panel 87 and an earth engaging portion or blade 91 extending between the end plates and along the lower portion of back panel 87. A pair of coaxial pivot pins 93, 93 extending respectively through side rails 23, 23 and end plates 89, 89 pivotally secure earth working member 21 transversely and slightly rearwardly of the midsection of frame 11. Blade 91 is adapted for swinging pivotal movement generally forwardly and rearwardly relative to frame 11.

A pair of linklike connectors 95, 95 pivotally interconnect earth working member 21 and yoke member 75. Connectors 95, 95 extend longitudinally and are arranged respectively along the inward sides of rail members 23, 23. Pivot pins 97, 97 extend respectively through earth working member end plates 89, 89 and through the rearward end portions of connectors 95, 95. Pivot pins 99, 99 extend respectively through the distal end portions of yoke member pivot arms 79, 79 and through the forward end portions respectively of connectors 95, 95. With reference to the drawing, it will be noted that the pivot axes of pins 97, 97 are below the stationary pivot axis of pivot pins 93, 93 and the pivot axes of pins 99, 99 are above the stationary pivot axis of yoke member supporting pins 83, 83. Rearward movement of blade 91 thus causes downward movement of land wheels 19, 19 relative to frame 11.

Jack means 101 is provided for urging land wheels 19, 19 downwardly relative to frame 11; the downward movement of wheels 19, 19 by reactive action through yoke member 75 is adapted to simultaneously raise the frame and earth working member away from the land surfaces.

Jack means 101 includes a boxlike base 103 fixedly secured on the rearward medial section of frame cross member 27. Base 103 includes a back plate 105 and side plates 107, 107 secured together in generally U-sectioned configuration. Back plate 105 abuttingly engages the rearward wall surface of frame member 27. Bolts 109, 109 arranged across the upper and lower surfaces of frame member 27 extend respectively through base back plate 105 and spanner plate 111 and rigidly clamp base 103 on cross member 27.

A pair of parallel arms 113, 113 are fixedly secured on and extend radially from yoke member body 77. A pair of pinned support struts 115, 115 provide center bearing means for yoke member 75. Upper and lower pins 117, 119 extending respectively through the upper and lower end portions of struts 115, 115, base 103 and arms 113, 113 provides a center support bearing for yoke member 75. With reference to the drawing, it will be noted that lower pivot pin 119 is in coaxial arrangement with pivot pins 83, 83 extending through yoke member pivot arms 79, 79.

A piston-cylinder assembly 121 is pivotally connected at its lower end by a pin 123 passing through the distal end portions of arms 113, 113 and piston rod 125. A pair of jack links 127, 127 interconnect the upper end of piston-cylinder assembly 121 with base 103. Pins 131, 133 passing respectively through the opposite end portions of jack links 127, 127, through base side plates 107, 107 and base end 129 of cylinder assembly 121 articulatingly interconnect cylinder assembly 121 with base 103. A stop bar 135 fixedly bridging the upper portions of base side plates 107, 107 is adapted to abuttingly engage jack links 127, 127. When piston-cylinder assembly 121 is actuated to an extended disposition (see FIG. 8), link members 127, 127 pivotally move upwardly and abuttingly engage the undersurface of bar 135. The articulated connection of cylinder assembly 121 with base 103 permits the cylinder assembly to freely move upwardly and downwardly when it is in a retracted disposition (see FIGS. 6 and 7). Conduits 137, 139 (schematically shown) extend forwardly from piston-cylinder assembly 121 and terminate respectively in coupling members 141, 143.

The leveler implement is adapted to be detachably attached to a tractor indicated T in FIGS. 1 and 2. A pin 145 extending through the distal end of tongue 117 is adapted to engage with drawbar D of tractor T. Conduit coupling members 141, 143 are adapted to engage and be coupled with hydraulic power unit U of tractor T to cause selective extension and retraction of piston-cylinder assembly 121.

The working disposition of the land leveling implement of the present invention is as shown in FIG. 6 in which it will be seen the piston-cylinder assembly 121 is in a retracted position, and the blade 91 is in a forward position, wherein it is angled downwardly and forwardly. As the implement travels over the ground, if the forces against blade 91 exceed a given amount, as for example, if the composition of the surface is too hard, the rearward pull against blade 91 which is transmitted through the links 95 causes the yoke member 75 to rotate clockwise as viewed in FIG. 6, and the wheels 19 to press downwardly, thereby raising the frame 11 and automatically reducing the depth of the cut in the land surface, or if the blade 91 strikes a solid object, as illustrated by the rock R in FIG. 7, the above described action will cause the frame 11 to raise quickly and the blade to be angled rearwardly, as seen in FIG. 7, which will aid the blade in passing over the rock or the like. It will be understood that the rearward pull against blade 91 must be greater than the effect of the weight of frame 11 and its associated parts, or the raising of frame 11 will not take place and the implement will remain in the normal working disposition shown in FIG. 6. In addition, it will be understood that when it is desired to transport the implement of the present invention, the piston-cylinder assembly 121 is extended which causes the parts to move into the position shown in FIG. 8 with the frame 11 and blade 91 spaced substantially above the land surface S.

Now, while I have shown and described an exemplary embodiment of the present invention, it will be understood that various modifications and rearrangement of components and elements of structure may be made without departing from the scope of the invention as defined in the attendant claims.

I claim:

1. A land leveling implement adapted to be trailingly drawn by a tractor comprising a long horizontal frame, frame support means arranged at the opposite ends of said frame adapted for running engagement with the land surface, an earth working member having an earth engaging surface, means pivotally securing said earth working member from said frame with said earth engaging surface thereof being guidingly constrained in pivotal movement generally forwardly and rearwardly relative to said frame about an axis substantially transverse relative to said frame, at least two land wheels adapted to run on the land surface, wheel mounting means mounting said wheels from said frame generally intermediate the length of said frame and with each wheel being journaled on an axle guidingly constrained in upward and downward movement relative to said frame, and means interconnecting said wheel mounting means and said earth working member at a place on said earth working member below said axis for causing said wheels to move downwardly relative to said frame in response to a rearward pull on said interconnecting means caused by movement of said earth engaging surface rearwardly relative to said frame.

2. The implement of claim 1 wherein said frame support means includes a forward and a rearward runner each having undersurfaces adapted to slidingly engage the land surface, and including pivot means pivotally securing said forward and rearward runners each on a pivot axis lying transversely of said frame respectively on the forward and rearward end portions of said frame.

3. The implement of claim 1 wherein said earth working member includes a generally planar blade having an earth engaging surface defining a horizontal edge adapted for cutting or scraping the land surface.

4. The implement as defined in claim 1 and additionally including means for simultaneously forcibly moving the axles of said land wheels downwardly relative to said frame for raising said frame away from the land surface.

5. A land leveling implement adapted to be trailingly drawn by a tractor equipped with a hydraulic power system, the implement comprising a long horizontal frame, a forward and a rearward runner each having an undersurface adapted to slidingly engage the land surface, pivot means pivotally securing said forward and rearward runners each on a pivot axis lying transversely of said frame respectively on the forward and rearward end portions of said frame, an earth working member having a generally horizontal earth engaging surface, means pivotally supporting said earth working member from said frame with said earth engaging surface thereof being guidingly constrained in pivotal arced movement forwardly and rearwardly relative to said frame, at least two land wheels adapted to run on the land surface, a yoke member journaling said wheels laterally spaced apart and in relatively fixed arrangement, means pivotally supporting said yoke member from said frame intermediate the length of said frame and forwardly of said earth working member and with the axle of each wheel being guidingly constrained in pivotal arced movement upwardly and downwardly relative to said frame, at least one long connector arranged longitudinally of said frame, means pivotally securing the rearward end of said connector with said earth working member at a location below the earth working member supporting pivot axis, means pivotally securing the forward end of said connector with said yoke member at a location above the yoke member supporting pivot axis, and jack means connectable with the hydraulic power system of a tractor for pivotally urging said land wheels downwardly relative to said frame and against the land surface: the jack means being actively operative to urge the land wheels downwardly against the land surface, and by reactive action through the yoke member, to raise the frame and earth working member away from the land surface.

6. The implement of claim 5 wherein said jack means includes arm structure rigidly fixed on said yoke member and projecting radially and generally rearwardly from the yoke member supporting pivot axis, a hydraulic double-acting piston-cylinder assembly having oppositely movable attachment points, means pivotally securing one of said attachment points on the distal end of said arm structure, at least one jack link, pivot means at the opposite ends of said jack link pivotally securing said jack link interconnectingly respectively to the other one of said piston-cylinder assembly attachment points and to said frame, conduit means extending from said piston-cylinder assembly adapted for connection with the hydraulic power system of the tractor, and stop means abuttingly engageable with said jack link for stopping the pivotal travel of said jack link upon actuation of said piston-cylinder assembly to an extended disposition.

7. The apparatus of claim 7 which includes means for supporting said frame in a raised level disposition with said forward and rearward runners being free of the land surface when said piston-cylinder assembly is actuated to an extended disposition including a tongue pivotally secured on a horizontal axis at its rearward end to the forward end portion of said frame and on a pivot axis extending transversely of said frame, stop means for stopping the downward pivotal travel of said tongue relative to said frame generally at a horizontal disposition, and relative weight means on the opposite or the forward and rearward sides of said pair of land wheels for causing the forward runner to be raised first when said piston-cylinder assembly is moved to an extended disposition: with said implement trailingly attached by its tongue to a tractor, and as said piston-cylinder assembly is actuated to an extended disposition, sequentially, the forward runner raises from the land surface, the tongue pivots downwardly against the stop means, and then the rearward runner raises from the land surface.

8. A land leveling implement adapted to be trailingly drawn by a tractor, the implement comprising a long horizontal frame, a forward and a rearward runner each having an undersurface adapted to slidingly engage the land surface, pivot means pivotally securing said forward and rearward runners each on a pivot axis lying transversely of said frame respectively on the forward and rearward end portions of said frame, an earth working member having a generally horizontal earth engaging surface, means pivotally supporting said earth working member from said frame with said earth engaging surface thereof being guidingly constrained in pivotal arced movement forwardly and rearwardly relative to said frame, at least two land wheels adapted to run on the land surface, a yoke member journaling said wheels laterally spaced apart and in relatively fixed arrangement, means pivotally supporting said yoke member from said frame intermediate the length of said frame and forwardly of said earth working member and with the axle of each wheel being guidingly constrained in pivotal arced movement upwardly and downwardly relative to said frame, at least one long connector arranged longitudinally of said frame, means pivotally securing the rearward end of said connector with said earth working member at a location below the earth working member supporting pivot axis, and means pivotally securing the forward end of said connector with said yoke member at a location above the yoke member supporting pivot axis.